US010491542B2

(12) United States Patent
Liou et al.

(10) Patent No.: US 10,491,542 B2
(45) Date of Patent: Nov. 26, 2019

(54) DYNAMIC ALLOCATION OF NETWORK BANDWIDTH

(71) Applicant: Infinera Corporation, Sunnyvale, CA (US)

(72) Inventors: Christopher Liou, Cupertino, CA (US); Balaji Balasubramanian, San Jose, CA (US); Mahidhar Rajala, Cupertino, CA (US); Srinivasan Seetharaman, Millbrae, CA (US); Anurag Sharma, Cupertino, CA (US); Sri Mohana Satya Srinivas Singamsetty, Cupertino, CA (US)

(73) Assignee: Infinera Corporation, Sunnyvale, CA (US)

( * ) Notice: Subject to any disclaimer, the term of this patent is extended or adjusted under 35 U.S.C. 154(b) by 136 days.

(21) Appl. No.: 15/805,832

(22) Filed: Nov. 7, 2017

(65) Prior Publication Data
US 2019/0140976 A1    May 9, 2019

(51) Int. Cl.
*H04L 12/46* (2006.01)
*H04L 12/911* (2013.01)

(52) U.S. Cl.
CPC ......... *H04L 47/82* (2013.01); *H04L 12/4641* (2013.01)

(58) Field of Classification Search
CPC ... H04L 47/82; H04L 12/4641; H04L 47/825; H04L 47/127; H04L 45/34; H04L 45/58; H04L 45/02; H04L 45/50
USPC ........................................................ 709/226
See application file for complete search history.

(56) References Cited

U.S. PATENT DOCUMENTS

2017/0264981 A1* 9/2017 Wiktor ................... H04B 10/27
2017/0300353 A1* 10/2017 Yu ........................... H04L 29/08

* cited by examiner

*Primary Examiner* — Tu T Nguyen
(74) *Attorney, Agent, or Firm* — David L. Soltz

(57) ABSTRACT

A method and apparatus for the efficient dynamic allocation of additional bandwidth in an optical virtual private network (OVPN) are described herein. A software defined network (SDN) controller may receive a request from an end-user of an OVPN for active bandwidth. Then, the SDN controller may determine whether the OVPN requires additional bandwidth to satisfy the request. As of the request, the additional bandwidth may be pre-deployed, but not yet activated for use. In an example, a path computation element (PCE) of the SDN controller may make this determination. Further, the SDN controller, on a condition that additional bandwidth is required, may determine whether additional bandwidth may be activated based on a policy of the end-user. As a result, the SDN controller, on a condition that additional bandwidth may be activated, may transmit an activation message to one or more line cards of the OVPN to activate the additional bandwidth.

20 Claims, 11 Drawing Sheets

800

DYNAMIC ALLOCATION OF NETWORK BANDWIDTH

FIELD OF INVENTION

The disclosed embodiments are generally directed to network communication. Specifically, the disclosed embodiments are directed to optical network communication using optical nodes of adjustable bandwidth.

BACKGROUND

Virtual private networks (VPNs) provide users with the ability to send and receive data across public data networks in ways similar to sending and receiving data over a private data network. As a result, applications running over a VPN on a public network may benefit from the increased security, functionality and management efficiency of private networks. Optical VPNs (OVPNs) may offer greater capacity and bandwidth than electronic VPNs, such as electronic layer 2 VPNs (L2VPNs) or layer 3 VPNs (L3VPNs). An OVPN is a virtual network defined in software that maps to a physical optical network infrastructure. In an OVPN, a network virtualization layer may abstract virtual nodes and virtual links from physical nodes and physical links. An OVPN may define a slice or portion of the physical network that is independent from any other slice or portion of the physical network. The OVPN may be defined independently with respect to bandwidth, users, user management, network services, network/service related policies and the like. Further, a service provider's network operator may create multiple independent VPNs over a shared physical network infrastructure.

Different OVPNs may follow different OVPN models or abstractions. For example, an OVPN may follow a cloud abstraction model, and include cloud and edge points where services terminate, but no nodes or links visible to the end user. In another example, an OVPN may follow a virtual network topology abstraction model, and include virtual nodes and links visible to the end user.

An OVPN may include several generalized virtual transport network components. For example, the OVPN may include one or more virtual transport nodes. The virtual transport nodes may operate in a logical transport system or virtual transport system with or without switching capability. The OVPN may also include one or more virtual transport ports, which may be logical ports for service connectivity that map to physical port resources. Some, but not necessarily all, of the physical ports may be enabled for software defined networks (SDNs). In addition, the OVPN may include a virtual transport link, which may be a generalized topological bandwidth link that maps to some set of physical resources and provides a tunnel to an adjacent virtual transport node, or a tributary. The virtual transport link may include logical endpoints and link attributes. Further, the virtual transport link may have multi-service transparency and may span multiple physical systems.

An OVPN may be used for a layer one (L1) instant video network (WN) with bandwidth dedicated to customers, tenants or end users. In examples described herein, the term end users may be used interchangeably with the terms customers or tenants. A service provider may reserve bandwidth on a per customer basis. This reservation may include guaranteed performance and availability of the OVPN bandwidth. The topology of the virtual transport network (VTN) may be visible to tenants, and include virtual switches and virtual links. In addition, dedicated capacity may be pre-allocated to each virtual link. Also, a service provider may provision services over allocated bandwidth per a customer's L1 IVN routing policy or OVPN routing policy. The service provider may implement a customer's routing policy using a path computation element (PCE) under multiple constraints, include one or more of latency, cost, number of hops and the like. Also, the service provider may provision services allowing customers to implement diverse routing and customer-driven traffic engineering. Further, the service provider may provide end users with L1 IVN specific monitoring or OVPN specific monitoring, including monitoring for specific events, triggering alarms and performance monitoring (PM). In addition, the service provider may provide end users with user interface (UI) and application programming interface (API) programmability. Such programmability may include the use of a representational state transfer (REST) interface, network configuration protocol (NETCONF) and the yet another next generation (YANG) language.

An OVPN may be used for a network abstracted L1 IVN with bandwidth dedicated to end users. In an example, an OVPN created using virtual links with dedicated bandwidth may expose a network-level abstraction to the customer/end-users. The service provider may use an internet-based service model for the OVPN. Further, the capacity for the OVPN may be carved out from an SDN domain. The service provider may assign the capacity for the OVPN. Also, the service provider may isolate each OVPN from the other OVPNs. In addition, the service provider may provide parallel links in the OVPN which may be differentiated by different features, such as latency, for example. In an example, the network topology may be abstracted with no customer visibility to the link topology of the OVPN. In a further example, an SDN controller-based route computation may be made based on service requirements established by end users.

An OVPN may be used for a network abstracted L1 IVN with a bandwidth pool shared by end users. The service provider may use an internet-based service model for the OVPN. Further, there may be no capacity specifically dedicated for the OVPN. Instead, the OVPN may share the same bandwidth pool as the production network. In an example, the service provider may provide no network topology representation to the end-user. In a further example, an SDN controller-based route computation may be made based on service requirements established by end users.

SUMMARY

A method and apparatus for the efficient dynamic allocation of additional bandwidth in an optical virtual private network (OVPN) are described herein. In an example, a software defined network (SDN) controller may receive a request from an end-user of an OVPN for active bandwidth. Then, the SDN controller may determine whether the OVPN requires additional bandwidth to satisfy the request. As of the request, the additional bandwidth may be pre-deployed, but not yet activated for use. In an example, a path computation element (PCE) of the SDN controller may make this determination. Further, the SDN controller, on a condition that additional bandwidth is required, may determine whether additional bandwidth may be activated based on a policy of the end-user. In an example, the PCE of the SDN controller may also make this determination. As a result, the SDN controller, on a condition that additional bandwidth may be activated, may transmit an activation message to one or more line cards of the OVPN to activate the additional bandwidth for use.

In a further example, the SDN controller may map a virtual network link to physical network resources. Also, the additional bandwidth capacity may be temporarily activated based on a type of capacity required by the OVPN, a request of an end-user for temporary bandwidth service on the OVPN, or a network failure condition of the OVPN. In another example, the additional bandwidth may be drawn from an active bandwidth pool.

In an additional example, an SDN controller may receive a request from an end-user of an OVPN for a service of the OVPN. The SDN controller may then determine whether the requested service of the OVPN requires additional bandwidth. In an example, the determination may be based on routing constraints of the requested service and a shortest aggregate optical reach. Further, the SDN controller, on a condition that additional bandwidth is required, may determine a bandwidth license allocation based on a bandwidth allocation policy of a network operator of the OVPN. Also, the SDN controller may transmit an activation message to one or more line cards of the OVPN to activate bandwidth associated with the bandwidth license allocation.

In an example, the determination whether the requested service of the OVPN requires additional bandwidth may be performed by the PCE of the SDN controller. Further, the determination of the bandwidth license allocation may be performed by the PCE.

DETAILED DESCRIPTION OF THE EMBODIMENTS

Figure 1:
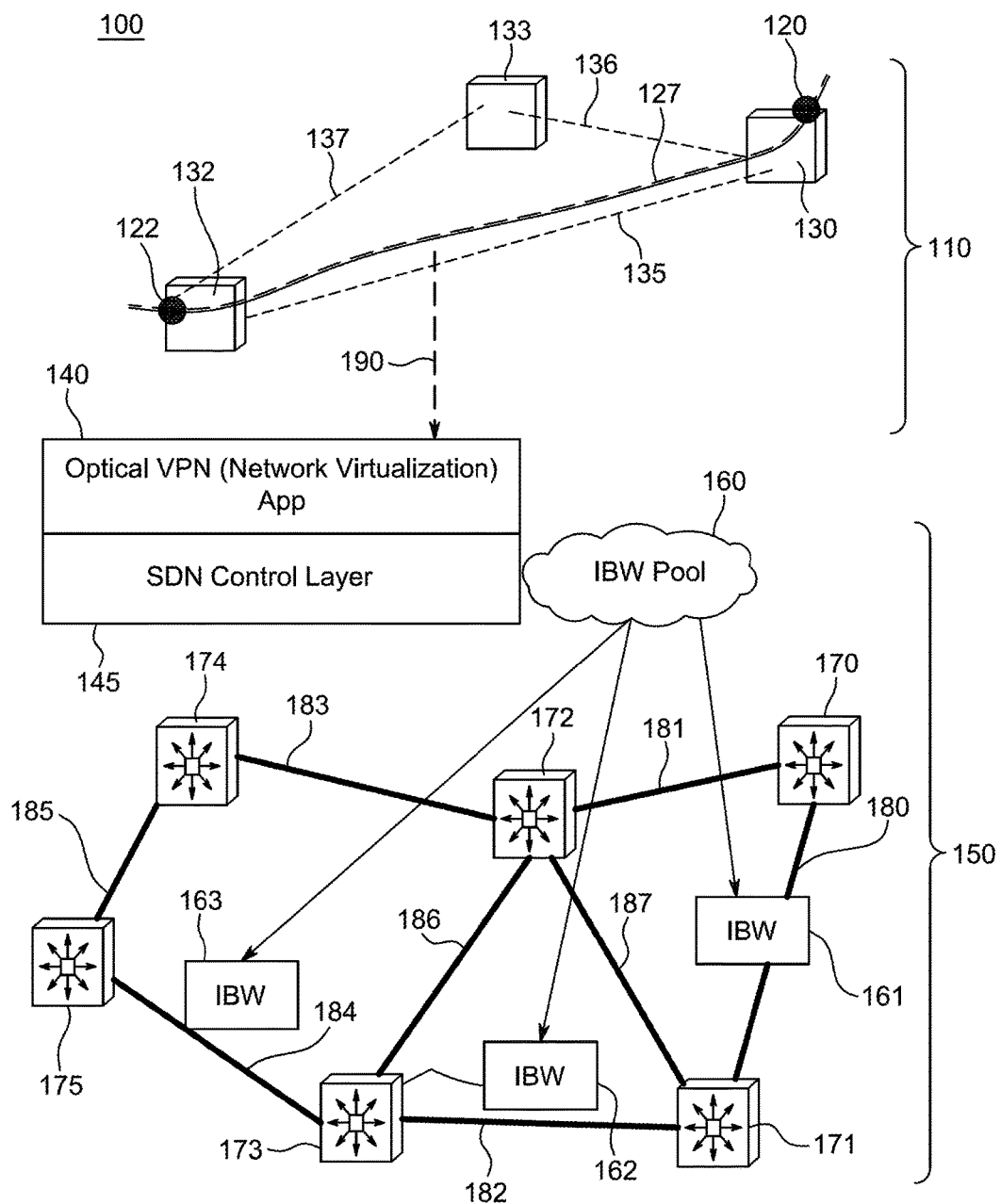
FIG. 1 is a network diagram of an example of a transport network abstraction of an optical virtual private network (OVPN) using dynamically allocated bandwidth capacity and instantaneous bandwidth (IBW) pools.

Optical virtual private networks (OVPNs) often require that service providers pre-allocate bandwidth capacity. Typically, pre-allocating bandwidth involves service providers allocating bandwidth capacity ahead of activating any real optical services. As a result, service providers are often required to spend capital on optical equipment for pre-deployment over a fiber optic network before revenue streams from customers may be realized. Such pre-deployment allows service providers to respond to customer demands with minimum lead-time. However, pre-deployment of optical equipment involves costly initial investments. Further, inaccuracy in forecasts for capacity needs may ultimately lead to an imperfect and inefficient network topology, which may lead to inefficient use of capital and to non-optimal network paths. Such imperfections are often compounded by the optical nature of OVPNs. OVPNs require a network operator or service provider to pre-allocate capacity for all virtual links comprising the virtual network topology, before first the optical wave service can be provisioned by an end-user.

However, customers or end users are often reluctant to pre-pay service providers for all the pre-allocated capacity in advance of an actual need to utilize that capacity. In addition, the service providers may be reluctant to incur the cost involved in constructing and preparing capacity so that it is available for end users. Further, service providers often experience a significant gap in time between making such investments in capacity and receiving revenue for that capacity from end users.

The inefficient network topologies caused by pre-allocating OVPN capacity may be alleviated by dynamically allocating capacity on OVPNs. Policy-driven real-time bandwidth capacity allocation may result in more efficient network topologies.

Accordingly, an end-user of an OVPN may send a request for active bandwidth to a software defined network (SDN) controller of the OVPN. If the OVPN requires additional bandwidth to satisfy the request, the SDN controller may determine whether additional bandwidth may be activated based on a policy of the end-user. If the additional bandwidth may be activated, the SDN controller may send an activation message to one or more line cards of the OVPN and thereby satisfy the end-user's request for the active bandwidth.

In examples described herein, active bandwidth refers to pre-deployed, but not yet activated, bandwidth that may be activated upon request. Further, in examples described herein, active bandwidth may refer to dynamically allocated bandwidth, and the terms may be used interchangeably. An example of a system that utilizes dynamically allocated bandwidth is a system utilizing Infinera Corporation's Instant Bandwidth (IBW) solution. Dynamically allocated bandwidth may be activated for use following only a short lead time after the request. For example, the short lead time may be under one second. In an example, the short lead time may be a matter of about thirty minutes. In a further example, the short lead time may be about two hours. In another example, the short lead time may be less than a day. In a further example, the short lead time may be about two days. Other similar short lead times may be used and still be consistent with examples provided herein. This short lead time is an improvement in efficiency over previous approaches which required lead times of eight weeks or more. Also, the dynamically allocated bandwidth may be activated for a finite period of time, in an example. In additional examples, the bandwidth may be allocated incrementally, progressively and/or in multiple allocations, depending upon the end-user's requests. In examples, the increments may be one or more of 25 gigabits per second (Gbps), 37.5 Gbps, 50 Gbps or 100 Gbps. As a result, the end-user may more efficiently use a network infrastructure, such as the OVPN, which is flexible and adjustable to changing end-user needs.

FIG. 1 is a network diagram of an example of a transport network abstraction of an OVPN using dynamically allocated bandwidth capacity and IBW pools. As shown in an example in network diagram 100, an L1 OVPN 110 may be defined by a meta-topology. A service provider may create the OVPN 110 for a customer. OVPN 110 may include virtual transport nodes, such as virtual transport nodes 130, 132, 133, connected by virtual links, such as virtual links 135, 136, 137. For example, virtual transport node 130 may be connected to virtual transport node 132 by virtual link 135. Further, virtual ports may be allocated to the virtual transport nodes. For example, virtual port 120 may be allocated to virtual transport node 130 and virtual port 122 may be allocated to virtual transport node 132. The service provider may assign the virtual ports to the virtual transport nodes. Further, this assignment may be based on a request by the end-user to the service provider.

The virtual links may map to a predetermined path on physical network 150 and the virtual transport nodes may map to physical transport systems of the physical network 150. Physical network 150 may include physical network nodes, such as physical network nodes 170, 171, 172, 173, 174, 175 connected by physical links, such as physical links 180, 181, 182, 183, 184, 185, 186, 187. For example, physical network node 170 may be connected to physical network node 171 by physical link 180. The physical network nodes, such as physical network nodes 170, 171, 172, 173, 174, 175, may be or may include optical transport network (OTN) network elements.

In an example, the OVPN 110 may include no pre-allocated capacity on virtual links. Instead, the capacity of the virtual links may be a variable allocation defined by a bandwidth upper limit. However, bandwidth availability may not be guaranteed on each virtual link. In addition, the virtual links may have traffic engineering metrics, such as, for example, cost metrics, latency, utilization, encryption type, security and the like.

In another example, the OVPN 110 may employ policy-driven real-time bandwidth allocation. Bandwidth capacity may be added to the OVPN 110 at the time of service provisioning. Further, a path for a service request, such as path 127 between virtual port 120 and virtual port 122, may be determined by virtual link metrics, up to a bandwidth limit.

The service request may be sent as an intent 190 from an end user with general service requirements to an SDN controller, which may interpret intent 190 and determine to satisfy the service request using the SDN controller's optical Virtual private networks (VPN) application 140 and SDN control layer 145. Accordingly, the SDN controller may use its path computation element (PCE) to determine available routes of path 127. The route of path 127 may be determined by routing policies and traffic engineering metrics associated with the virtual links of the path, such as virtual link 135. In an example, if the determined route of path 127 includes a virtual link that does not include sufficient capacity, then the SDN controller may automatically add dynamic allocation bandwidth, up to a maximum physical link capacity, to that virtual link based on a policy or the SDN controller may find an alternate route to satisfy the service request between virtual port 120 and virtual port 122. In addition, an SDN controller may check bandwidth availability from a shared bandwidth pool, such as a dynamic allocation bandwidth pool, which may be referred to as IBW pool 160. IBW pool 160 may be a set of pre-generated bandwidth licenses, such as bandwidth licenses 161, 162, 163, that may be assigned to the physical network in order to activate capacity on line cards for the corresponding physical links, such as physical links 180, 182, 184, respectively. In an example, bandwidth licenses, such as bandwidth licenses 161, 162, 163, may be assigned dynamically, as needed.

In an example, the customer may have visibility to the virtual network topology and to the bandwidth available to add to the virtual link. Also, the service provider may have visibility to the virtual network topology to maximize the aggregate bandwidth. As a result of dynamically allocating bandwidth or IBW licensing, the OVPN 110 has an opportunity at network efficiency optimization, which may result in economic optimization. In an example, the service provider may make the pool of IBW licenses 160 available to the SDN controller to apply to the network instantaneously. In this way, the service provider may defer the cost of bandwidth until a customer request is initiated.

In another example, virtual links can map to more than one physical fiber path through the physical network. The bandwidth of the virtual links can potentially include capacity from more than one network path between virtual nodes, such as virtual node A and virtual node B, provided the bandwidth meets the virtual link bandwidth requirements. For example, a virtual link may be characterized by latency range versus a specific latency value. In addition, a virtual link may be mapped to physical network resources by the SDN controller, and may provide an abstraction of the bandwidth provided by the physical network.

Figure 2A:
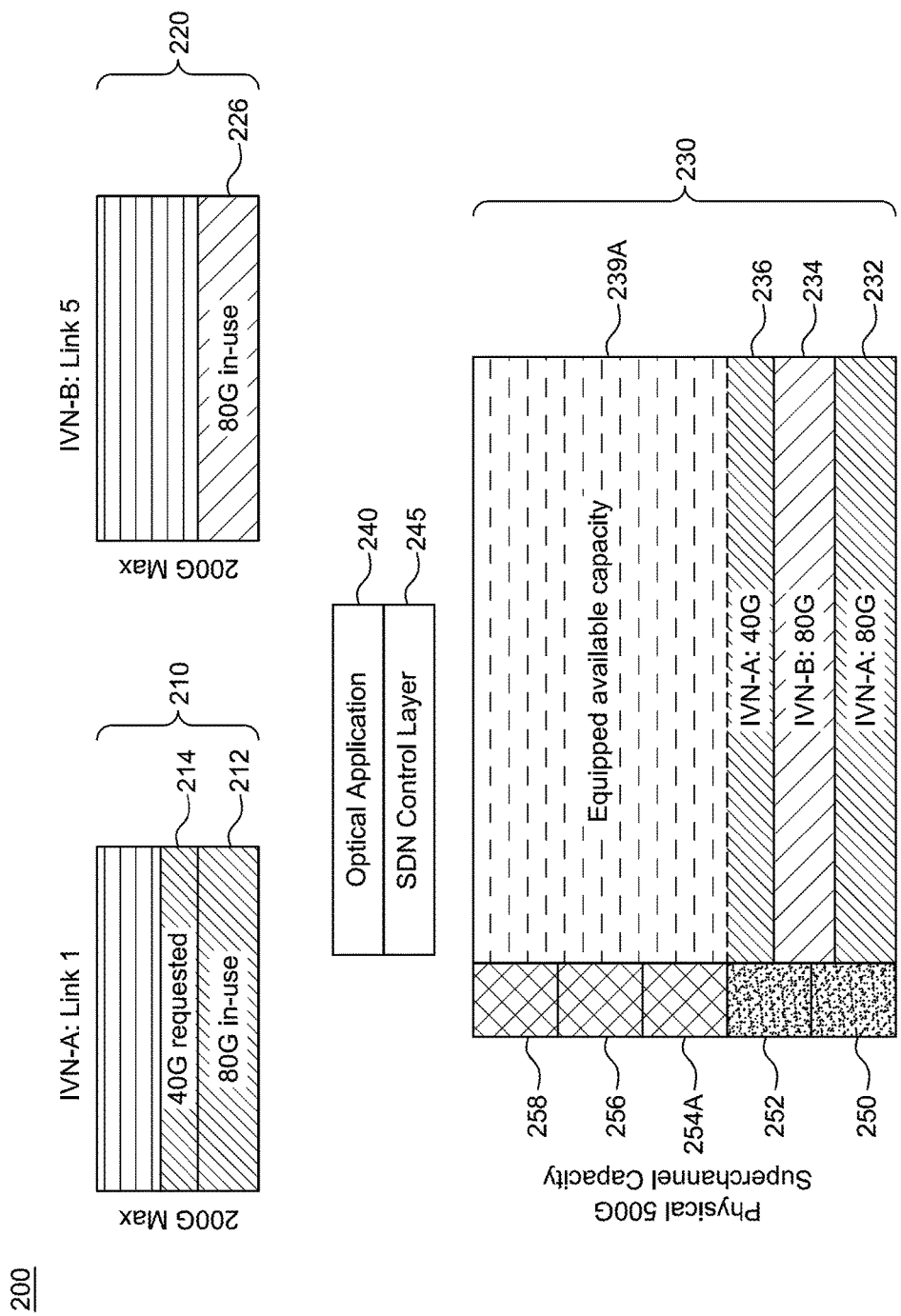
FIG. 2A is a diagram of an example of automatically allocating OVPN virtual link bandwidth.

FIG. 2A is a diagram of an example of automatically allocating OVPN virtual link bandwidth. In an example shown in diagram 200, an SDN controller may route 80 Gbps 212 of a first service IVN-A over a first virtual link 210, which may have a 200 Gbps maximum capacity and be labeled link 1 and 80 Gbps 226 of a second service of IVN-B over a second virtual link 220, which may also have a 200 Gbps maximum capacity and be labeled link 5. The SDN controller may use an optical application 240, such as an XCEED instant virtual networks application, which may run on an SDN control layer 245, such as an XCEED multi-layer SDN platform. The SDN controller may route the 80 Gbps 212 first service and the 80 Gbps 226 second service over a same physical link 230 with 500 Gbps capacity. The SDN controller may assign 80 Gbps capacity 232 of physical link 230 for the 80 Gbps 212 first service and 80 Gbps capacity 234 of physical link 230 for the 80 Gbps 226 second service. Capacity 232 and capacity 234 may be provided pursuant to IBW license 250 and IBW license 252. In an example, IBW licenses 250, 252, 254A, 256, 258 may each have a capacity of 100 Gbps. As shown in FIG. 2A, IBW licenses 250, 252 may be activated and IBW licenses 254A, 256, 258 may not be currently activated.

Further, a PCE in an SDN controller may route 40 Gbps of a third IVN-A service 214, requested by an end-user, over a minimum latency path and reserve bandwidth for this path.

Figure 9:
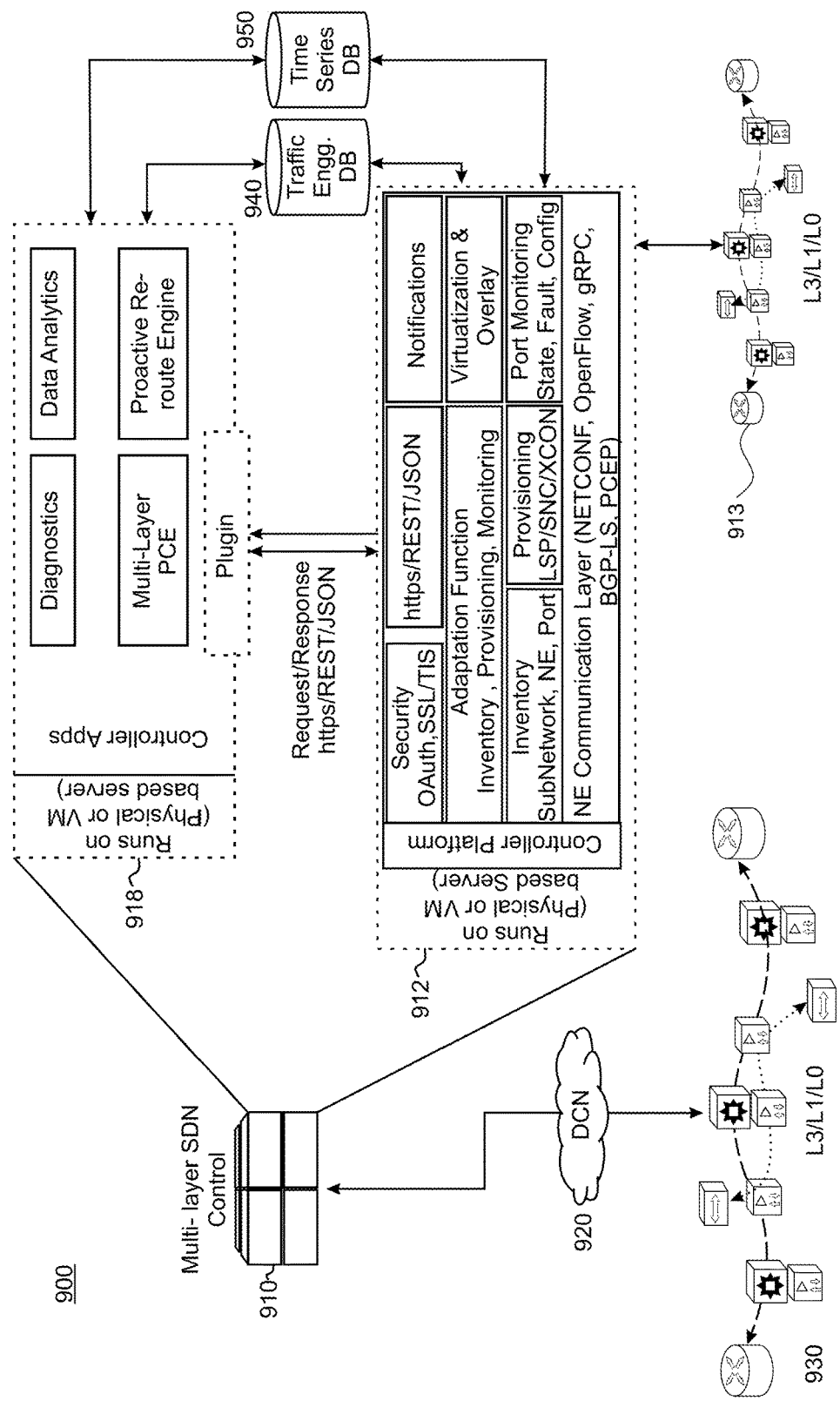
FIG. 9 is a network diagram illustrating an example of a multi-layer SDN controller managing virtual network resources and bandwidth licenses in a multi-fiber network, and the platforms and applications of the SDN controller.

A PCE may perform computation of the physical path needed based on the routing requirements of the service and policy associated with the IVN instance. Once it finds a suitable physical path, the SDN Controller may provision the physical path on the physical network based on the computation performed by its PCE. The PCE may determine all the traffic engineering metrics of all links by way of a Traffic Engineering Database (TED), as shown in FIG. 9.

The PCE of the SDN controller may assign 40 Gbps capacity 236 of physical link 230 for the 40 Gbps 214 third service. Capacity 232, capacity 234 and capacity 236 may be provided pursuant to IBW bandwidth license 250 and IBW bandwidth license 252. As a result, the PCE may determine that 200 Gbps of capacity of the physical link 230 may be used. The PCE may also determine that 300 Gbps of bandwidth capacity of the physical link 230 may remain as equipped available capacity 239A.

Further, the service may be routed without exceeding the maximum allowed bandwidth for each virtual link in the path. For example, adding the third IVN-A service 214 to first IVN-A service 212 results in 120 Gbps needed on the virtual link for the path, which is below the 200 Gbps maximum capacity for the virtual link. In addition, the first service 212, second service 226 and third service 214 may be provided pursuant to a default policy or a first policy of an end-user, stored and administered by the PCE.

In a further example, the PCE may receive and store a second policy. The second policy may allow the PCE to consider equipped, but unlicensed, bandwidth when choosing paths for routing. The second policy may also allow the PCE to activate IBW if additional licensed capacity is needed and reserve bandwidth for an IVN link or OVPN link to maintain a certain percentage of bandwidth headroom.

The SDN controller and OVPN application may follow several workflows, as shown in the following examples. In an example, physical network infrastructure is pre-deployed, but bandwidth capacity is not yet licensed by the service provider. The PCE may use a trigger for assigning IBW licenses to the physical network to enable bandwidth capacity. In an example, the SDN controller may activate additional bandwidth capacity based on triggering by the PCE, which may identify that more capacity may need to be activated by end-user OVPN instances. The additional bandwidth capacity may be activated by the SDN controller applying one or more additional IBW licenses to the physical network.

In an example, multiple OVPN instances may have virtual links whose total maximum bandwidth exceeds what is available on the physical network. This may result, for example, from oversubscription of bandwidth. As a result, the capacity from physical network may be assigned to virtual links on a first-come, first-served basis.

In another example, when a service request within an OVPN is initiated, a route computation may be done by the PCE on the OVPN meta topology, based on service routing requirements and constraints. Once path across meta topology is determined, bandwidth to support that service may then be allocated from the physical network. To speed up the allocation, the SDN controller may have cached information about how much physical network capacity is currently available to add to each virtual link in the L1 OVPN instances.

In a further example, if the physical network does not have sufficient licensed capacity, then the SDN controller may apply IBW licenses to appropriate physical links to activate capacity. For example, OVPN B requests 40 Gbps service, but the policy in the SDN controller may actually result in a request to add 80 Gbps bandwidth to the virtual link. The physical network may not have enough licensed capacity but may have enough deployed capacity, which may be unlicensed. The SDN controller may have awareness of and track deployed physical capacity, licensed capacity, and unlicensed capacity. The PCE logic and policy engine may utilize this information when routing the service. However, before provisioning the service, the PCE logic and policy engine may dynamically activate capacity and then allocate appropriate amount of capacity to the virtual link to support the service request. The SDN controller may activate incremental capacity using a programmable software activation license. The SDN controller may activate the incremental capacity by sending a message to the physical network with the IBW license, or by sending a message to a license manager application, which may then send a message to the physical network with the IBW license. The license may be drawn from a bandwidth pool for quick access, such as IBW pool 160 of FIG. 1. Further, the license may be for any size increment.

Also, the license may be temporary or time-based, depending on type of capacity required by OVPN. As another example optimization, if the license pool is sparse, or if there is dormant capacity elsewhere in the network that was activated using a mobile IBW license, then the controller may decide to move that IBW license to a location where capacity is required, depending on policy.

Figure 2B:
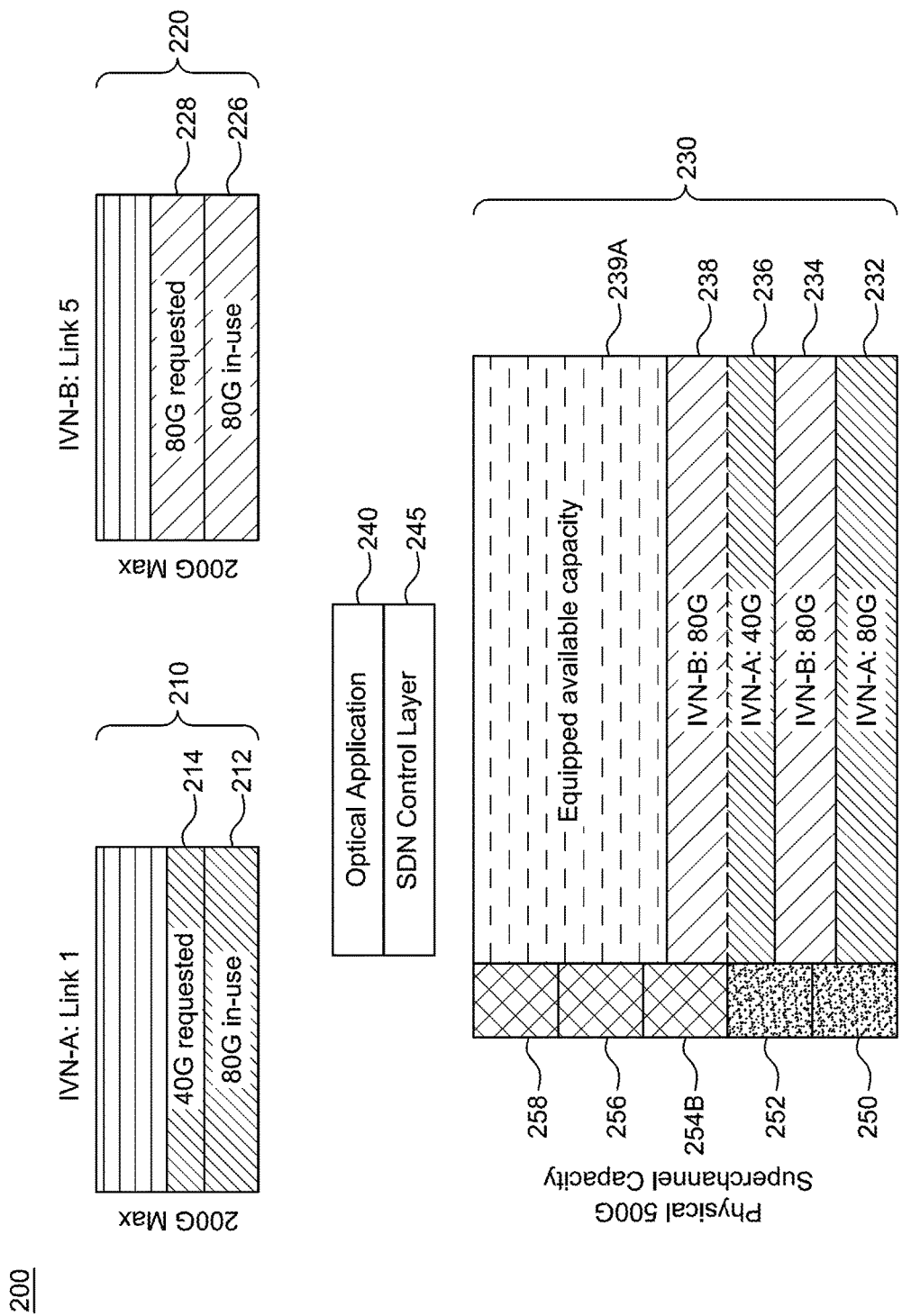
FIG. 2B is another diagram of an example of automatically allocating OVPN virtual link bandwidth.

FIG. 2B is another diagram of an example of automatically allocating OVPN virtual link bandwidth. As shown in FIG. 2B, the PCE in the SDN controller may receive a request for a fourth service from an end-user for 40 Gbps of IVN-B over the second virtual link 220. The PCE may reserve bandwidth pursuant to a second policy of the end-user. The second policy of the end-user may consider equipped, but unlicensed, bandwidth and may reserve bandwidth for the IVN-B second virtual link 220 as well as maintain additional headroom bandwidth. As a result, the PCE may assign 80 Gbps of capacity 238 from the physical link 230.

Further, the PCE may determine that IBW licenses 250, 252 may not provide enough activated capacity for capacities 232, 234 and 236 and addition to capacity 238. Therefore, the PCE may activate IBW license 254B. IBW licenses 256, 258 may remain as not currently activated, as shown in FIG. 2B. Further, the equipped available capacity 239B of FIG. 2B may be reduced by 80 Gbps to 220 Gbps as compared with the 300 Gbps equipped available capacity 239A of FIG. 2A.

In an example, the OVPN end-user request can influence the type of bandwidth activation license to trigger. For example, if the end-user specifies temporal bandwidth service on the OVPN, this may result in temporal bandwidth licenses being allocated and applied to the physical network, depending on the network policy defined in the SDN controller.

Also, if the end-user requests that the OVPN support dynamic network expansion to support a failure recovery scenario or failure restoration scenario affecting the OVPN, this may result in the SDN controller adding temporal bandwidth triggered by a network failure condition, and restore services within the dynamic OVPN. In an example scenario, incremental bandwidth may be suddenly required, but not currently allocated to the OVPN. The SDN controller of the OVPN may burst bandwidth capacity and support a temporary increase in bandwidth capacity on a particular set of links, until the service can be restored back to the original path.

In an additional example, the SDN controller may keep track of how licenses are utilized/allocated from the license pool, and based on this, may accrue bandwidth license costs incurred. Further, the dynamic allocation of bandwidth to OVPNs may also be hierarchical or nested in nature. For example, a dynamic OVPN defined on a physical network can in turn support multiple client OVPNs. In another example, a service provider may lease a dynamic OVPN from another OVPN, network operator, service provider or carrier, and in turn, offer smaller dynamic OVPNs to its customers.

Figure 3:
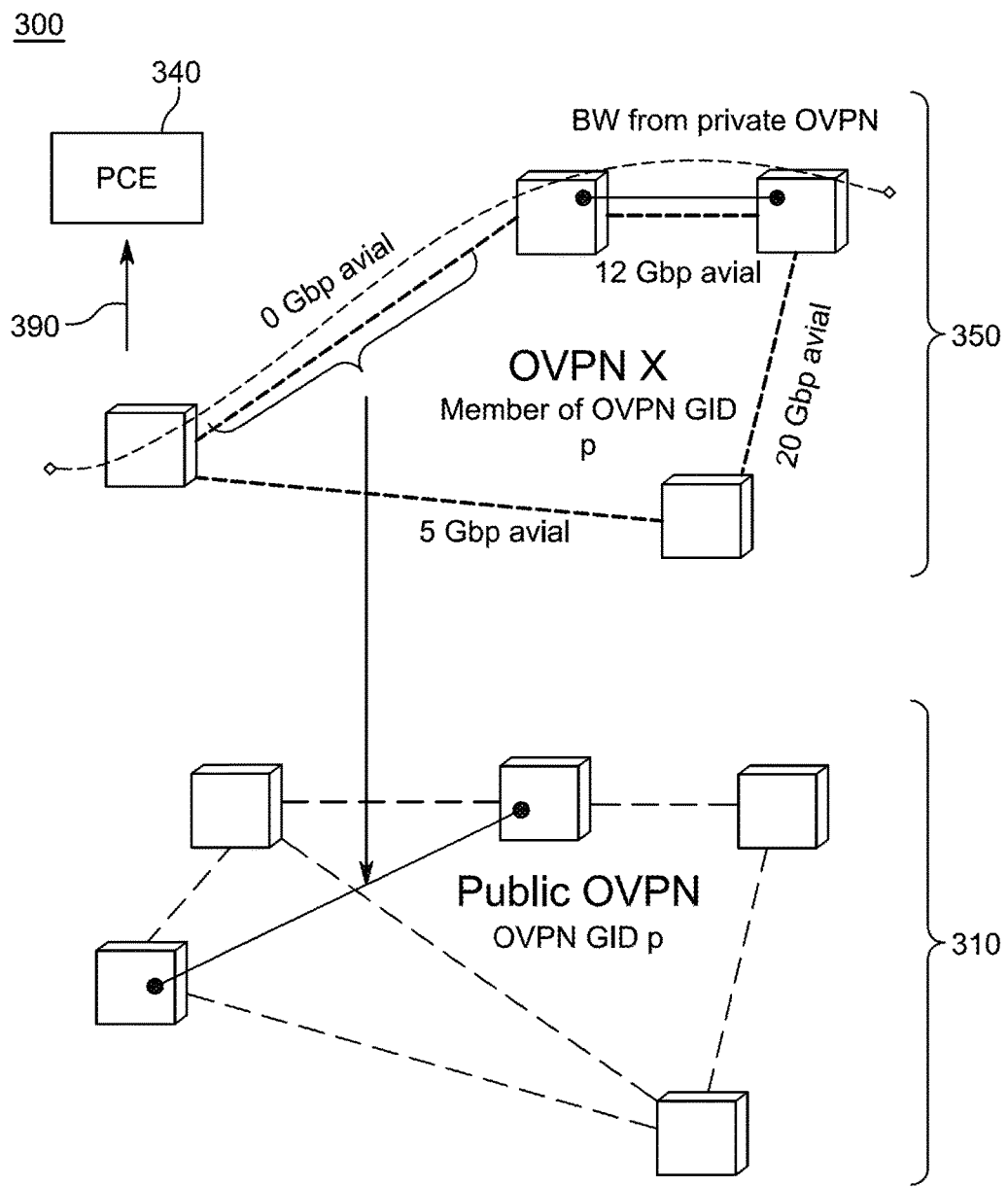
FIG. 3 is a diagram of an example of a multi-layer (ML) path computation element (PCE) computing path resources for hierarchical OVPNs.

FIG. 3 is a diagram of an example of a multi-layer (ML) PCE computing path resources for hierarchical OVPNs. In an example, the PCE may be an ML PCE. In an example shown in diagram 300, hierarchical OVPNs may include OVPNs defined from another OVPN. For example, OVPN X 350 may source bandwidth from another OVPN, such as a public OVPN 310. The PCE 340 of the SDN controller may manage the meta-topology of OVPN X 350 and may track bandwidth allocation per OVPN ID. The PCE 340 of the SDN controller may have visibility of all OVPN instances and their relationship to the physical network. Based on access privileges, OVPN X 350 can request incremental capacity from the public OVPN 310, just as the public OVPN 310 may request incremental capacity from the physical network (not shown).

In an example, the PCE 340 of the SDN controller may compute paths based on a requestor and tagged resources. For example, a network administrator of a network operator may assign an identity (ID), such as an OVPN group ID (GID) or set of GIDs to a public OVPN, such as public OVPN 310. A GID may be considered to be a tag to use for tagged resources. Further, when hierarchical OVPN X 350 was created, the network administrator may assign a GID for OVPN X 350. The GID of OVPN X 350 may be used to denote access to public OVPNs, such as public OVPN 310, that offer bandwidth to those entities with a matching GID. The GID may be used in an approach similar to an access list which includes both users and user groups. In an example, the network operator of OVPN X 350 may be a requestor.

Further, a public OVPN may provide sharable bandwidth to private OVPNs. In an example, the creation of a public OVPN which may serve as a pool of bandwidth for multiple private or hierarchical OVPNs. As an example, the public OVPN may be considered a parent OVPN to a child OVPN or multiple children OVPN. For example, OVPN X 350 may be considered to be the child of parent public OVPN 310. In addition, a OVPN may be a child of another OVPN and not be constrained to a public/private relationship.

The bandwidth capacity of the public OVPN may be statically or dynamically allocated. The bandwidth resources of the private OVPN may map to the physical resources of the public OVPN that may be shared. Further, the public OVPN resources may map to the physical network resources. In another example, the private OVPN may map to both the physical network resources directly as well as to virtual resources of a public OVPN, in a hybrid approach.

In an example, the SDN controller may assign an OVPN GID to the private OVPNs based on a request from a network administrator. The sharable bandwidth of the public OVPN may be used by a private OVPN when that private OVPN exhausts its existing bandwidth allocation. Further, the network administrator may also identify the set of GIDs for child/private OVPNs that will be allowed in as a form of access control for the public OVPN.

A private OVPN may access the pool of bandwidth resources of the public OVPN by identifying the public OVPN resources in a request by the private OVPN. In an example, the relationship between the private OVPN and the public OVPN may be analogous to the relationship between an OVPN and a physical network. In a further example, resources tagged with both the public OVPN ID and OVPN GID may be considered by the PCE. In an example, if a provisioning request within the private OVPN results in the need for additional bandwidth, the private OVPN may source that from the public OVPN. This can be autonomously triggered, in an example. In another example, the network administrator of the private OVPN may manually request incremental bandwidth. In an additional example, that incremental bandwidth for the private OVPN may also come directly from the physical network, as in the hybrid model mentioned elsewhere herein.

In example shown in FIG. 3, OVPN X 350 and public OVPN 310 may share a GID of GID p. In this way, OVPN X 350 may be a member of the group with GID p. Further, OVPN X 350 may send a request 390 to PCE 340 of the SDN controller for 10 Gbps of bandwidth from public OVPN 310. In an example, the PCE 340 of the SDN controller may compute a path across resources tagged with OVPN ID x and OVPN GID p. If the PCE 340 of the SDN controller successfully computes such a path, request 390 may be satisfied by public OVPN 310 providing 10 Gbps of capacity of a path to OVPN X 350.

Further, the policy rules of the private OVPN and public OVPN may control access to and allocation of the pool of bandwidth resources of the public OVPN. A policy rule may be defined for the private OVPN instance that describes when, where and how the private OVPN may obtain incremental bandwidth. Policy rules may be very general, such as, for example, time-of-day, cost, whether the public OVPN has any capacity left, and the like.

Figure 4:
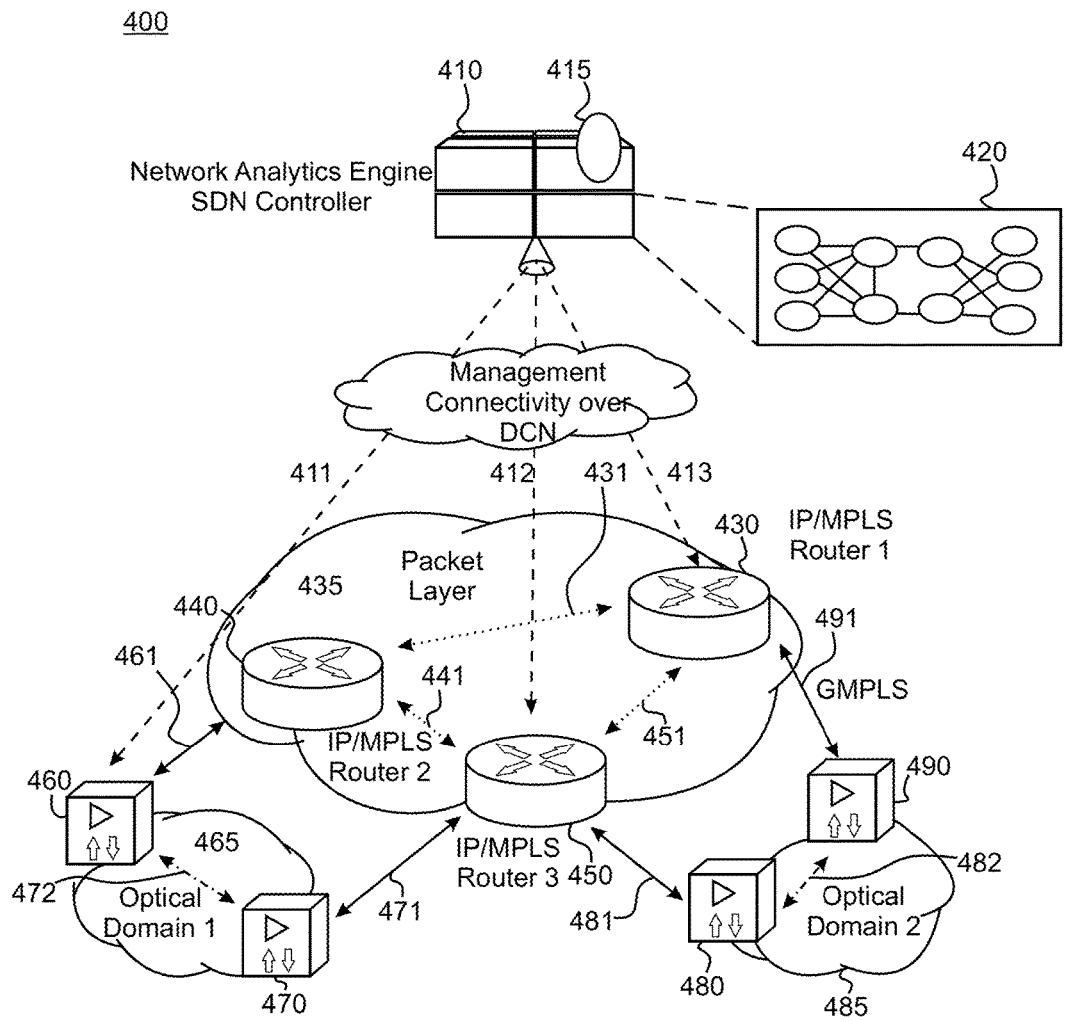
FIG. 4 is a network diagram illustrating an example of a software defined network (SDN) controller including a PCE in a multi-fiber network across both the packet layer and the optical layer.

FIG. 4 is a network diagram illustrating an example of an SDN controller including a PCE in a multi-fiber network across both the packet layer and the optical layer. As shown in diagram 400, an SDN controller 410 may include a PCE 415. The PCE may be an ML PCE. The SDN controller 410 may have multi-layer and multi-vendor capabilities. The user may be a manager of a network operator. Further, the SDN controller 410 and the PCE 415 may draw on one or more databases 420 for information about the network and network system performance metrics, such as, network topology, traffic engineering, performance monitoring and the like. The network may be an optical network. In an example, database 420 may be an INFINERA flight data recorder (FDR).

In an example shown in FIG. 4, the SDN controller 410 may have management connectivity over a management network, such as a data communications network (DCN), with devices such as routers 430, 440, 450 and optical add/drop multiplexing (OADM) devices 460, 470, 480, 490. The management connectivity may be implemented through communication channels, such as channels, 411, 412, 413, and may use protocols such as OpenFlow, network configuration protocol (NETCONF), border gateway protocol-link state (BGP-LS), path computation element protocol (PCEP) and the like. In an example case, BGP-LS and PCEP may be used in hybrid mode. The routers 430, 440, 450 may be Internet Protocol (IP)/multi-protocol label switching (MPLS) routers which may perform IP routing as well as MPLS encapsulation. OADM devices 460, 470, 480, 490 may be layer 0 devices and may perform optical add/drop multiplexing. Each of OADM devices 460, 470, 480, 490 may be a re-configurable OADM (ROADM) or a fixed OADM (FOADM).

The routers 430, 440, 450 may communicate with each other on the packet layer 435 by way of intra-layer logical connectivity using links 431, 441, 451. For example, routers 430, 440, 450 may have router-to-router connectivity using logical connectivity, with physical connectivity through an underlying layer. The packet layer 435 may include both data plane and control plane connectivity.

OADM devices 460, 470, 480, 490 may communicate with each other on optical domains 465, 485 by way of inter-optical layer connectivity using links 472, 482. For example, OADM devices 460, 470 may have wavelength division multiplexing (WDM) device to WDM device connectivity with each other over link 472 and OADM devices 480, 490 may have WDM device to WDM device connectivity with each other over link 482. Such connectivity may include long-haul connectivity, such as over 80 kilometers (km), or shorter reach connectivity.

OADM devices 460, 470, 480, 490 may communicate with routers 430, 440, 450 by way of cross-layer port-to-port connectivity using links 461, 471, 481, 491. For example, OADM devices 460, 470 may have cross-layer connectivity with routers 440, 450 over links 461, 471, respectively. Similarly, OADM devices 480, 490 may have cross-layer connectivity with routers 450, 430 over links 481, 491, respectively. Such connectivity may include a short or medium reach optical fiber patch. For example, such connectivity may include 2 km, 10 km or 40 km range connectivity. This cross-layer connectivity may be between layer 3 and layer 1, layer 3 and layer 0 or layer 1 and layer 0.

Through the example connectivity shown in FIG. 4, the SDN controller may communicate with the network to follow the procedures provided in FIGS. 1, 2A, 2B, 3, 5, 6, 7 and 8. For example, the SDN controller may communicate with the network using the example connectivity shown in FIGS. 4 to determine if additional bandwidth may be activated based on a policy of the end-user.

Figure 5:
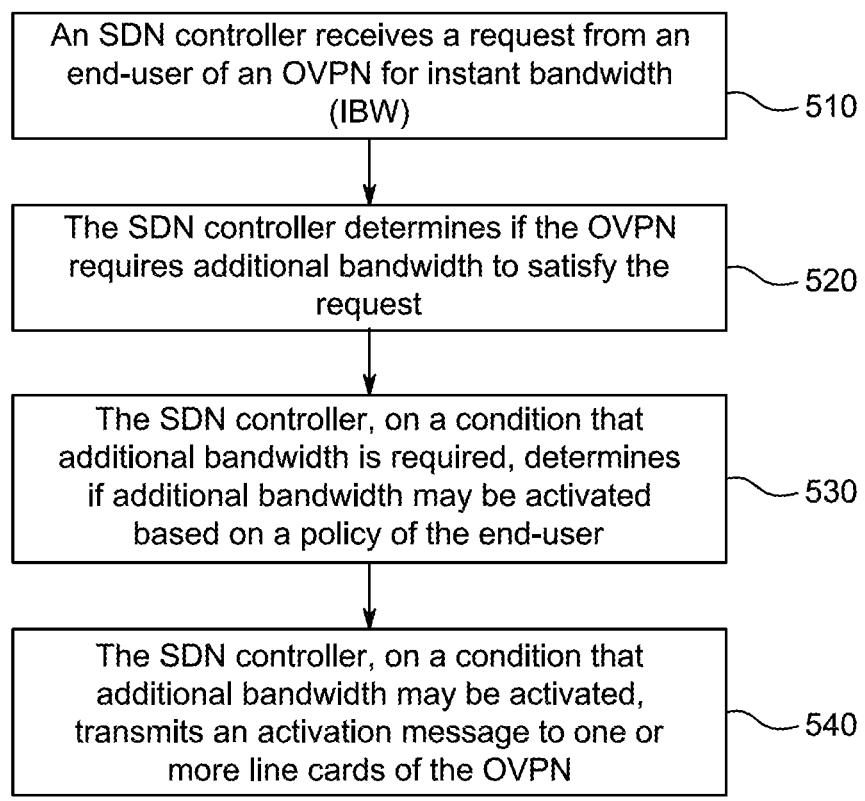
FIG. 5 is a flow diagram illustrating an example of the SDN controller activating additional bandwidth based on a policy of the end-user.

FIG. 5 is a flow diagram illustrating an example of the SDN controller activating additional bandwidth based on a policy of the end-user. In an example shown in flow diagram 500, an SDN controller may receive a request from an end-user of an OVPN for IBW 510. Then, the SDN controller may determine whether the OVPN requires additional bandwidth to satisfy the request 520. In an example, the PCE of the SDN controller may make this determination. Further, the SDN controller, on a condition that additional bandwidth is required, may determine whether additional bandwidth may be activated based on a policy of the end-user 530. In an example, the PCE of the SDN controller may make this determination. As a result, the SDN controller, on a condition that additional bandwidth may be activated, may transmit an activation message to one or more line cards of the OVPN 540.

Figure 6:
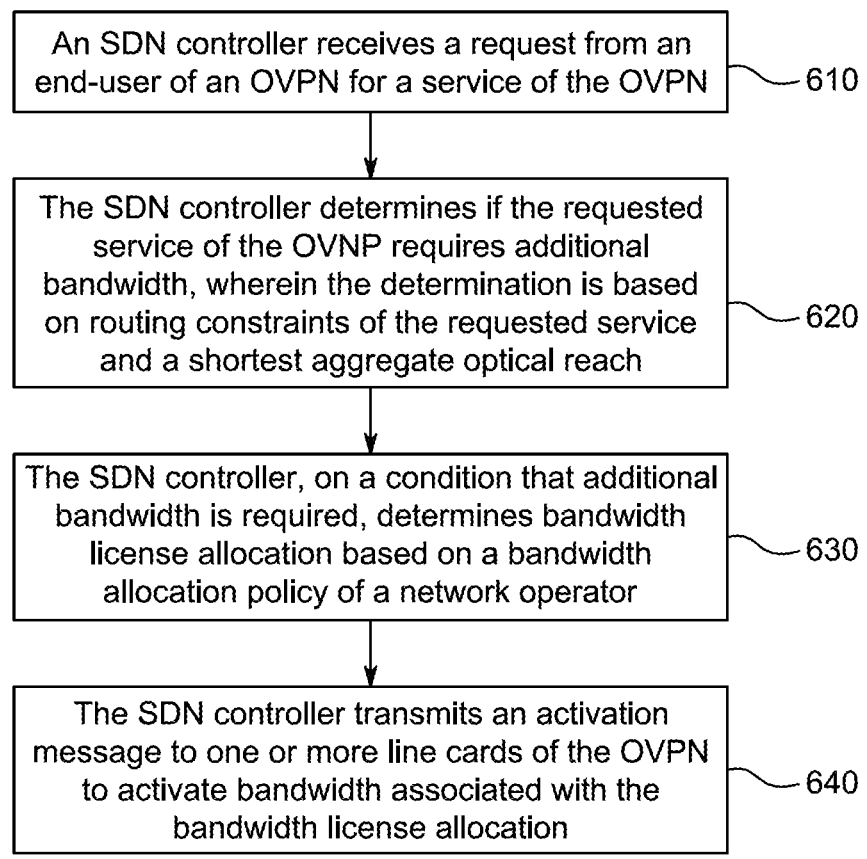
FIG. 6 is a flow diagram illustrating an example of the SDN controller activating additional bandwidth based on routing constraints and a shortest aggregate optical reach.

FIG. 6 is a flow diagram illustrating an example of the SDN controller activating additional bandwidth based on routing constraints and a shortest aggregate optical reach. In an example shown in flow diagram 600, an SDN controller may receive a request from an end-user of an OVPN for a service of the OVPN 610. The SDN controller may then determine whether the requested service of the OVPN requires additional bandwidth, wherein the determination is based on routing constraints of the requested service and a shortest aggregate optical reach 620. In an example, the PCE of the SDN controller may make this determination. In addition, the SDN controller may, on a condition that additional bandwidth is required, determine a bandwidth license allocation based on a bandwidth allocation policy of a network operator 630. In an example, the PCE of the SDN controller may make this determination. Consequently, the SDN controller may transmit an activation message to one or more line cards of the OVPN to activate bandwidth associated with the bandwidth license allocation 640.

Figure 7:
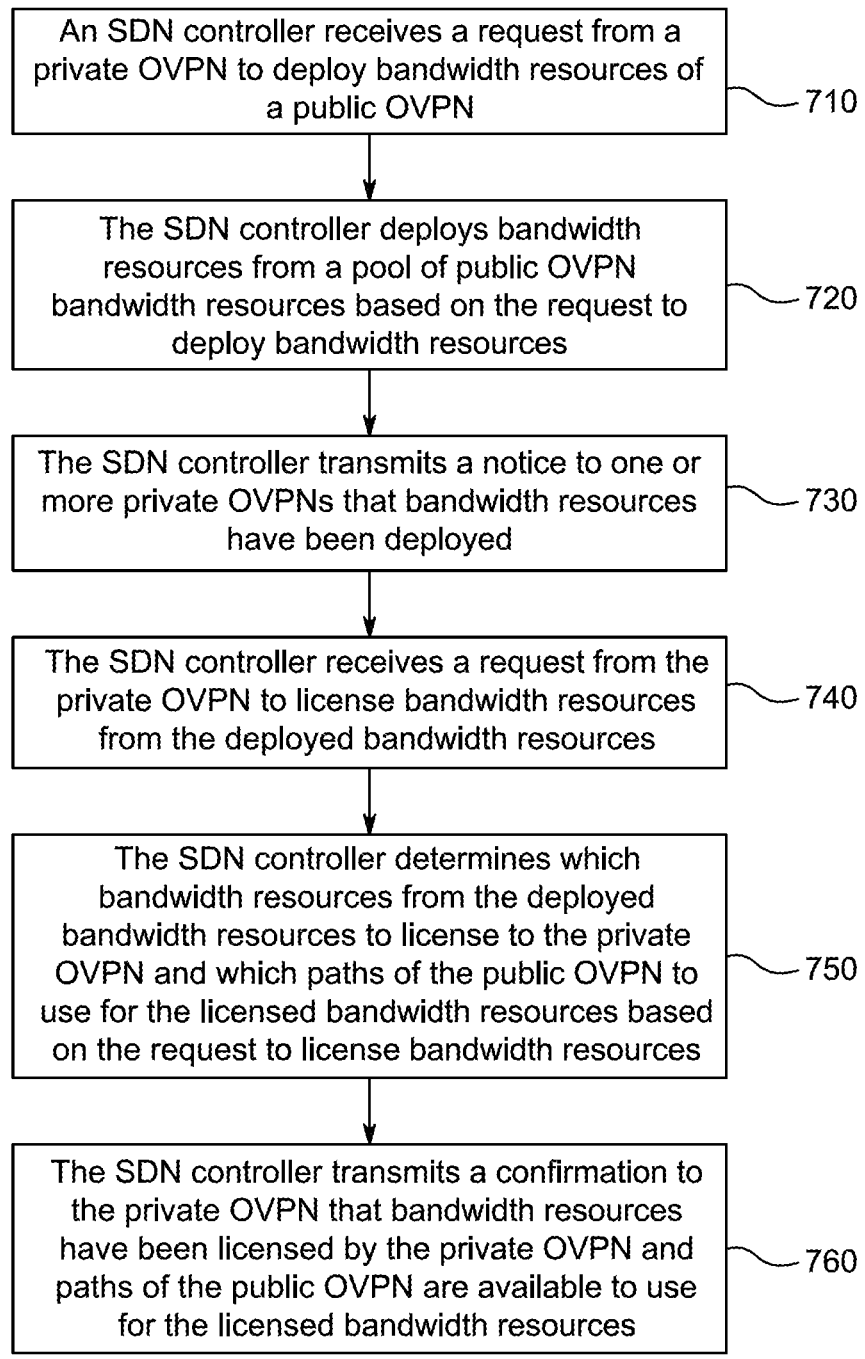
FIG. 7 is a flow diagram illustrating an example of the SDN controller allocating bandwidth resources of a public OVPN.

FIG. 7 is a flow diagram illustrating an example of the SDN controller allocating bandwidth resources of a public OVPN. In an example shown in flow diagram 700, the SDN controller may receive a request from a private OVPN to deploy bandwidth resources of the public OVPN 710. The SDN controller may deploy bandwidth resources from a pool of public OVPN bandwidth resources based on the request to deploy bandwidth resources 720. The SDN controller may transmit a notice to one or more private OVPNs that bandwidth resources have been deployed 730. The SDN controller may receive a request from the private OVPN to license bandwidth resources from the deployed bandwidth resources 740. The SDN controller may determine which bandwidth resources from the deployed bandwidth resources to license to the private OVPN and which paths of the public OVPN to use for the licensed bandwidth resources based on the request to license bandwidth resources 750. The SDN controller may transmit a confirmation to the private OVPN that bandwidth resources have been licensed by the private OVPN and paths of the public OVPN are available to use for the licensed bandwidth resources 760.

In examples provided herein, a centralized SDN controller may dynamically coordinate bandwidth licenses and network resources. The SDN controller may dynamically control and allocate network resources using licenses, and may respond autonomously to various evolving network demands, using logically centralized information. In an example, the licenses may be software licenses.

In examples, the SDN controller may use several different methods to allocate bandwidth resources and licenses. For example, the SDN controller may dynamically apply bandwidth licenses in response to various network stimuli. The network stimuli may include asynchronous events, proactive events and the like. The SDN controller may use a PCE to track and orchestrate a mix of physical, virtual and abstract resources simultaneously. For example, the SDN controller may perform bandwidth and license accounting, and manage cascaded hierarchical bandwidth requests such as in nested OVPNs. The license accounting may include physical capacity, licensed capacity, licensable capacity and the like.

The SDN controller may accelerate dynamic bandwidth allocation to virtual networks through pre-computation and through the caching of physical bandwidth available to support virtual links. The SDN controller may hybridize one or more virtual links to include both dedicated and dynamically allocated bandwidth. Dedicated bandwidth may be referred to as static bandwidth or semi-static bandwidth and the terms may be used interchangeably. The dynamically allocated bandwidth may be dynamically allocated with or without software-based licensing.

In another example, the SDN controller may route bandwidth service based on minimizing the number of incremental bandwidth licenses. Further, the SDN controller may incorporate bandwidth license costs into overall routing metrics and objectives.

In an additional example, the SDN controller may manage one or more OVPNs by creating a per-OVPN topology database and by instantiating a per-OVPN PCE. The SDN controller may manage the OVPN in these ways by using software containers. For example, a network provider may create an independent OVPN TED per OVPN instance, and have a private PCE running for each OVPN instance. In another example, the network provider may use a centralized PCE to store both the physical network information and all virtual network TEDs.

In a further example, the SDN controller may dynamically augment a network's bandwidth with software licenses to support automated service restoration, service protection, or spontaneous service demand increases. The software licenses may be fixed, movable, or time-based licenses.

In another example, the SDN controller may automatically move bandwidth licenses in order to automate bandwidth migration operations. The SDN controller may also apply time-based licenses in order to automate bandwidth migration operations. The bandwidth migration operations may include offloading services on a link or span so maintenance can be performed. Further, the SDN controller may dynamically apply bandwidth licenses by some unit of time. For example, the SDN controller may dynamically apply bandwidth licenses by the day, by the hour, by the minute and the like.

In an additional example, the SDN controller and a PCE may manage and track software bandwidth activation license inventory, bookkeeping and the dynamically assignment/unassignment to physical network resources. Further, the bandwidth license may be any level of bandwidth granularity. Also, the bandwidth license may be used on various devices and not be tied or bound to any specific physical device until activation time.

Moreover, the SDN controller may automate bandwidth license pool creation and management within the SDN controller throughout a network's lifecycle via a direct integration to bandwidth license suppliers. For example, the SDN controller may control assignment of bandwidth licenses from a pool to a network, and unassignment of bandwidth licenses back to a pool from a network. In an example, the SDN controller may sent a notification if the pool of bandwidth licenses begins to run low. In an example, equipment providers may be bandwidth license suppliers. Also, the SDN controller may auto-refresh bandwidth licenses. The auto-refreshing may be based on policy. Further, the SDN controller may auto-bill and perform accounting for the bandwidth licenses. For example, no manual intervention may be need to bill for the bandwidth licenses. Also, the SDN controller may automate management of the supply-chain of bandwidth licenses. In addition, the SDN controller may act as a centralized multi-vendor bandwidth license broker interacting with multiple individual bandwidth license servers.

In a further example, the SDN controller may automatically calendar bandwidth licenses and reserve bandwidth licenses. For example, instead of reserving physical bandwidth, the SDN controller may reserve bandwidth licenses for future activation. Also, the SDN controller may calendar bandwidth licenses for activation at a future date and time certain. In an example, an application may reserve the same license and calendar it for n different uses, all of which do not overlap in time.

In another example, the SDN controller and the PCE may automatically assign software licensed bandwidth based on multiple network and external stimuli. For example, the SDN controller and the PCE may automatically assign software licensed bandwidth based on dynamic requests to instantiate virtual networks on demand. Specifically, the SDN controller and the PCE may automatically assign software licensed bandwidth based on one or more of virtual network-on-demand requests, a recovery from network disaster, spontaneous traffic demand, dynamic protection-on-demand and the like.

Figure 8:
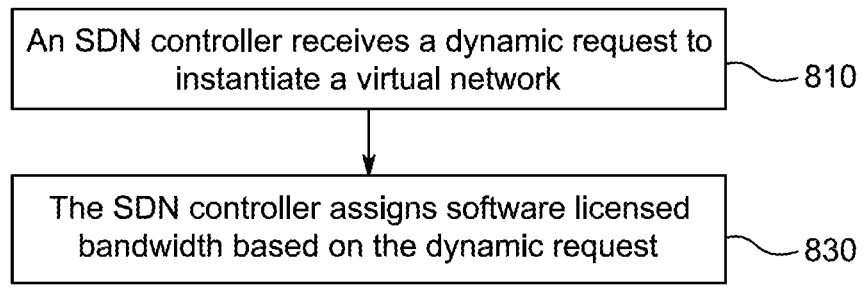
FIG. 8 is a flow diagram illustrating an example of the SDN controller allocating bandwidth resources to satisfy dynamic requests.

FIG. 8 is a flow diagram illustrating an example of the SDN controller allocating bandwidth resources to satisfy dynamic requests. As shown in flow diagram 800, an SDN controller may receive a dynamic request to instantiate a virtual network 810. The SDN controller may assign software-licensed bandwidth based on the dynamic request 830.

In an additional example, the SDN controller may automatically assign licensed bandwidth to support hierarchical dynamic OVPNs. Further, the SDN controller may include bandwidth and license accounting in a nested fashion.

FIG. 9 is a network diagram illustrating an example of a multi-layer SDN controller managing virtual network resources and bandwidth licenses in a multi-fiber network, and the platforms and applications of the SDN controller. As shown in diagram 900, the multi-layer SDN controller 910 may have management connectivity over a management network, such as DCN 920, through communication channels with devices in a network 930, such as routers on an IP/MPLS layer, OTN network elements on an OTN layer, OADM devices on a WDM layer and optical muxponders. In this way, the network may include one or more of layer 0, layer 1 and layer 3.

Further, the multi-layer SDN controller 910 may run controller applications 918 and functions on controller platform 912. The controller applications 918 and functions on controller platform 912 may run on physical servers or virtual machine based servers, and may use a network TED 940 and a time series database 950. The controller applications 918 may include diagnostics applications, data analytics applications, multi-layer PCE protocol applications, proactive re-route engine applications and plug-in applications. The plug-in applications may use functions such as request functions, response functions, hypertext transport protocol secure (https) functions, representational state transfer (REST) or RESTful functions and JavaScript object notation (JSON) functions. Further, the other applications in the controller applications 918 may use the plug-in application functions to draw on functions of the controller platform 912.

In addition, the controller platform 912 may include security functions, which may include Open Authorization (OAuth), secure sockets layer (SSL), and transport layer security (TLS) functions. Also, the controller platform 912 may include: adaptation functions, such as inventory functions, provisioning functions and monitoring functions; inventory functions, such as SubNetwork functions, Network Element (NE) functions and Port functions; and provisioning functions, such as LSP functions, SubNetwork Connection (SNC) functions and cross-connects (XCON) functions. Further, the controller platform 912 may provide notification functions as well as virtualization and overlay functions. Moreover, the controller platform 912 may provide port monitoring functions, such as state monitoring, fault monitoring and configuration monitoring. In order to communicate with the network 930, the controller platform 912 may use a network model 913 and NE communication layer, which may use protocols such as OpenFlow, NETCONF, BGP-LS, PCEP and the like, as well as generic remote procedure calls (gRPCs) and the like.

Figure 10:
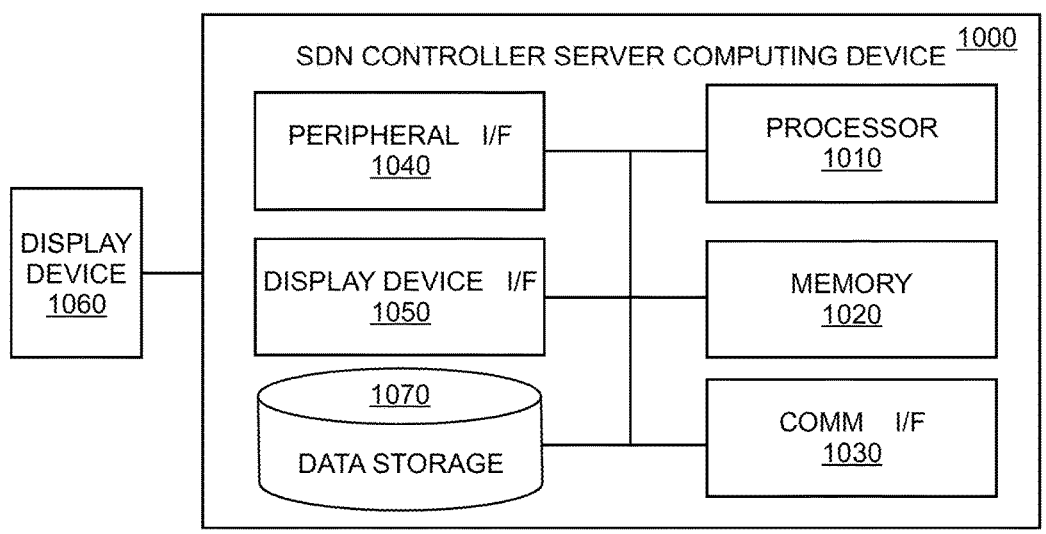
FIG. 10 is a diagram of an example SDN controller server computing device that may be used to implement one or more features described herein as performed by the SDN controller.

FIG. 10 is a diagram of an example SDN controller server computing device that may be used to implement one or more features described herein as performed by the SDN controller. The SDN controller server computing device 1000 may include a processor 1010, a memory device 1020, a communication interface 1030, a peripheral device interface 1040, a display device interface 1050, and a data storage device 1070. FIG. 10 also shows a display device 1060, which may be coupled to or included within the computing device 1000.

As used herein, the term "processor" refers to a device such as a single- or multi-core processor, a special purpose processor, a conventional processor, a Graphics Processing Unit (GPU), a digital signal processor, a plurality of microprocessors, one or more microprocessors in association with a DSP core, a controller, a microcontroller, one or more ASICs, one or more Field Programmable Gate Array (FPGA) circuits, any other type of integrated circuit (IC), a system-on-a-chip (SOC), a state machine, or a similar type of device. Processor 1010 may be or include any one or several of these devices.

The memory device 1020 may be or include a device such as a Random Access Memory (RAM), Dynamic RAM (D-RAM), Static RAM (S-RAM), other RAM or a flash memory. Further, memory device 1020 may be a device using a computer-readable medium. The data storage device 1070 may be or include a hard disk, a magneto-optical medium, a solid-state drive (SSD), an optical medium such as a compact disk (CD) read only memory (ROM) (CD-ROM), a digital versatile disk (DVDs), or Blu-Ray disc (BD), or other type of device for electronic data storage. Further, data storage device 1070 may be a device using a computer-readable medium. As used herein, the term "computer-readable medium" refers to a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVDs, or BD, or other type of device for electronic data storage.

The communication interface 1030 may be, for example, a communications port, a wired transceiver, a wireless transceiver, and/or a network card. The communication interface 1030 may be capable of communicating using technologies such as SDN technology, wide area network (WAN) technology, SD-WAN technology, Ethernet, Gigabit Ethernet, fiber optics, microwave, xDSL (Digital Subscriber Line), Institute of Electrical and Electronics Engineers (IEEE) 802.11 technology, Wireless Local Area Network (WLAN) technology, wireless cellular technology, or any other appropriate technology.

The peripheral device interface 1040 is configured to communicate with one or more peripheral devices. The peripheral device interface 1040 operates using a technology such as Universal Serial Bus (USB), PS/2, Bluetooth, infrared, serial port, parallel port, FireWire and/or other appropriate technology. The peripheral device interface 1040 may, for example, receive input data from an input device such as a keyboard, a keypad, a mouse, a trackball, a touch screen, a touch pad, a stylus pad, a detector, a microphone, a biometric scanner, or other device. The peripheral device interface 1040 may provide the input data to the processor 1010. The peripheral device interface 1040 may also, for example, provide output data, received from the processor 1010, to output devices such as a speaker, a printer, a haptic feedback device, one or more lights, or other device. Further, an input driver may communicate with the processor 1010, peripheral device interface 1040 and the input devices, and permit the processor 1010 to receive input from the input devices. In addition, an output driver may communicate with the processor 1010, peripheral device interface 1040 and the output devices, and permit the processor 1010 to provide output to the output devices. One of ordinary skill in the art will understand that the input driver and the output driver may or may not be used, and that the SDN controller server computing device 1000 will operate in the same manner or similar manner if the input driver, the output driver or both are not present.

The display device interface 1050 may be an interface configured to communicate data to display device 1060. The display device 1060 may be, for example, a monitor or television display, a plasma display, a liquid crystal display (LCD), or a display based on a technology such as front or rear projection, light emitting diodes (LEDs), organic LEDs (OLEDs), or Digital Light Processing (DLP). The display device interface 1050 may operate using technology such as Video Graphics Array (VGA), Super VGA (S-VGA), Digital Visual Interface (DVI), High-Definition Multimedia Interface (HDMI), or other appropriate technology. The display device interface 1050 may communicate display data from the processor 1010 to the display device 1060 for display by the display device 1060. Also, the display device may connect with speakers and may produce sounds based on data from the processor 1010. As shown in FIG. 10, the display device 1060 may be external to the computing device 1000, and coupled to the computing device 1000 via the display device interface 1050. Alternatively, the display device 1060 may be included in the computing device 1000. An instance of the computing device 1000 of FIG. 10 may be configured to perform any feature or any combination of features of the system and method described herein as performed by the SDN controller.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, metal-oxide semiconductor field-effect transistors (MOSFETs), ASICs, FPGAs circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor that implements aspects of the embodiments.

The suitable processors may include circuitry to implement the methods provided herein. The circuitry may include receiving circuitry, processing circuitry and transmitting circuitry.

The methods and flow charts provided herein may be implemented in a computer program, software, or firmware incorporated in a non-transitory computer-readable storage medium for execution by a general purpose computer or a processor. Examples of non-transitory computer-readable storage media, include, but are not limited to, a ROM, a RAM, a register, cache memory, semiconductor memory devices, magnetic media such as internal hard disks and removable disks, magneto-optical media, and optical media such as CD-ROM disks, and digital versatile disks (DVDs).

Further, the devices according to various embodiments described herein may be interspersed among other devices depending on the functionality of the server device. In addition, the number and components of the devices may vary depending on the functionality of the server device. By way of example, the number of servers, which may be virtual servers, acting as the SDN controller may be one or may be several servers, such as tens of servers.

What is claimed is:

1. A method comprising:
   receiving, by a software defined network (SDN) controller, a request for active bandwidth;
   determining, by the SDN controller, whether an optical virtual private network (OVPN) requires additional bandwidth to satisfy the request, wherein, as of the request, the additional bandwidth was pre-deployed, but not yet activated for use;
   on a condition that the additional bandwidth is required to satisfy the request, determining, by the SDN controller, whether the additional bandwidth may be activated for use based on a policy; and
   on a condition that the additional bandwidth may be activated for use based on the policy, transmitting, by the SDN controller, an activation message to one or more line cards of the OVPN to activate the additional bandwidth for use.

2. The method of claim 1, wherein the determination whether the OVPN requires additional bandwidth is performed by a path computation element (PCE) in the SDN controller.

3. The method of claim 1, wherein the determination whether additional bandwidth may be activated is performed by the PCE in the SDN controller.

4. The method of claim 1, further comprising:
   mapping, by the SDN controller, a virtual network link to physical network resources.

5. The method of claim 1, wherein the additional bandwidth is activated temporarily based on a type of capacity required by the OVPN.

6. The method of claim 1, wherein the additional bandwidth is activated temporarily based on a request of an end-user for temporary bandwidth service on the OVPN.

7. The method of claim 1, wherein the additional bandwidth is activated temporarily based on a network failure condition of the OVPN.

8. The method of claim 1, wherein the additional bandwidth is drawn from a dynamic allocation bandwidth pool.

9. A software defined network (SDN) controller comprising:
   a communication interface operatively coupled to a processor, the communication interface and the processor configured to receive a request for active bandwidth;
   the processor further configured to determine whether an optical virtual private network (OVPN) requires additional bandwidth to satisfy the request, wherein, as of the request, the additional bandwidth was pre-deployed, but not yet activated for use;
   the processor, on a condition that additional bandwidth is required to satisfy the request, further configured to determine whether additional bandwidth may be activated for use based on a policy; and
   the communication interface and the processor, on a condition that the additional bandwidth may be activated for use based on the policy, configured to transmit an activation message to one or more line cards of the OVPN to activate the additional bandwidth for use.

10. The SDN controller of claim 9, wherein the processor configured to determine whether the OVPN requires additional bandwidth is within a path computation element (PCE) in the SDN controller.

11. The SDN controller of claim 9, wherein the processor configured to determine whether additional bandwidth may be activated is within the PCE in the SDN controller.

12. The SDN controller of claim 9, further comprising:
    the communication interface and the processor configured to map a virtual network link to physical network resources.

13. The SDN controller of claim 9, wherein the additional bandwidth is activated temporarily based on a type of capacity required by the OVPN.

14. The SDN controller of claim 9, wherein the additional bandwidth is activated temporarily based on a request of an end-user for temporary bandwidth service on the OVPN.

15. The SDN controller of claim 9, wherein the additional bandwidth is activated temporarily based on a network failure condition of the OVPN.

16. The SDN controller of claim 9, wherein the additional bandwidth is drawn from a dynamic allocation bandwidth pool.

17. A method for use in a software defined network (SDN) controller in an optical virtual private network (OVPN), the method comprising:
    receiving, by the SDN controller, a request from an end-user of an OVPN for a service of the OVPN;
    determining, by the SDN controller, whether the requested service of the OVPN requires additional bandwidth, wherein the determination is based on routing constraints of the requested service and a shortest aggregate optical reach;
    on a condition that additional bandwidth is required, determining, by the SDN controller, a bandwidth license allocation based on a bandwidth allocation policy of a network operator of the OVPN; and
    transmitting, by the SDN controller, an activation message to one or more line cards of the OVPN to activate bandwidth associated with the bandwidth license allocation.

18. The method of claim 17, wherein the determination whether the requested service of the OVPN requires additional bandwidth is performed by a path computation element (PCE) in the SDN controller.

19. The method of claim 17, wherein the determining the bandwidth license allocation is performed by the PCE in the SDN controller.

20. The method of claim 17, further comprising:
    accelerating, by the SDN controller, the bandwidth license allocation through pre-computation and a caching of physical bandwidth available to support virtual links.

* * * * *